United States Patent [19]
Read

[11] Patent Number: 5,761,612
[45] Date of Patent: Jun. 2, 1998

[54] WIRELESS RECEIVER

[75] Inventor: Clifford D. Read, Stittsville, Canada

[73] Assignee: Northern Telecom Limited, Montreal, Canada

[21] Appl. No.: 719,303

[22] Filed: Sep. 19, 1996

[51] Int. Cl.$^6$ ............................................. H04B 1/03
[52] U.S. Cl. ........................... 455/90; 455/351; 455/575
[58] Field of Search ............................ 455/95, 550, 347, 455/90, 575, 128, 351; 361/729, 730, 732; 379/433, 435

[56] References Cited

U.S. PATENT DOCUMENTS

| | | | |
|---|---|---|---|
| 3,859,476 | 1/1975 | Morrell et al. | 379/435 |
| 4,136,344 | 1/1979 | Nakao et al. | 455/347 |
| 5,638,441 | 6/1997 | Hattori et al. | 379/433 |

FOREIGN PATENT DOCUMENTS 0175826  7/1991  Japan ........................ 379/58

Primary Examiner—Reinhard J. Eisenzopf
Assistant Examiner—Edan Orgad
Attorney, Agent, or Firm—R. J. Austin

[57] ABSTRACT

A wireless receiver having a first and second housings one of which contains a wireless signal transmission and receiving means. The other housing preferably contains a power supply and possibly a battery back-up for use in the event of a cut in the power supply. The two housings are hinged together. They are relatively movable between one position in which the two housings depend one from another so as to be mounted upon a vertical wall and another position in which the two housings are disposed one behind the other for supporting upon a horizontal surface. Preferably, in the position for mounting upon a wall, the two housings provide rear planar surfaces which are coplanar and in the other position for mounting upon a horizontal surface the two housings provide planar support surfaces for supporting them upon the horizontal surface. It is also preferable that these two support surfaces, when the housings are in a position for hanging vertically, lie closely adjacent, are parallel and confront each other so as to give the impression that the receiver is a single housing construction. Similarly with the housings in the other relative positions other surfaces confront and lie parallel to each other also to give the single housing impression.

5 Claims, 2 Drawing Sheets

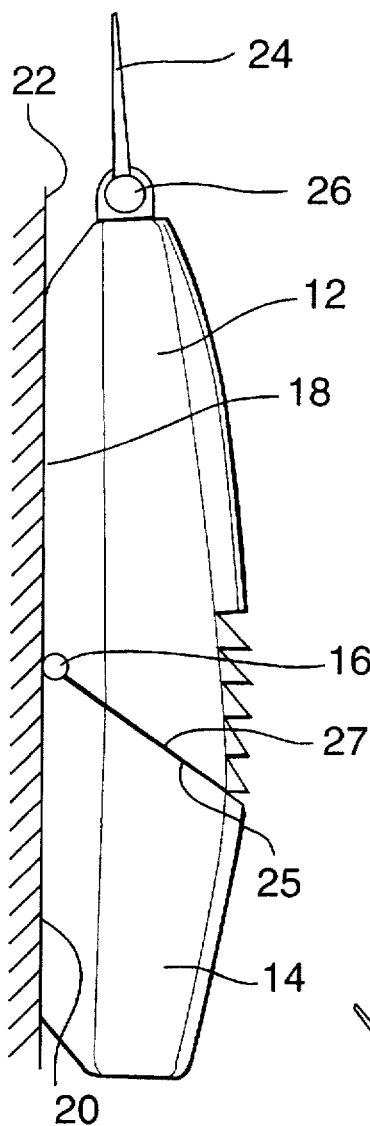
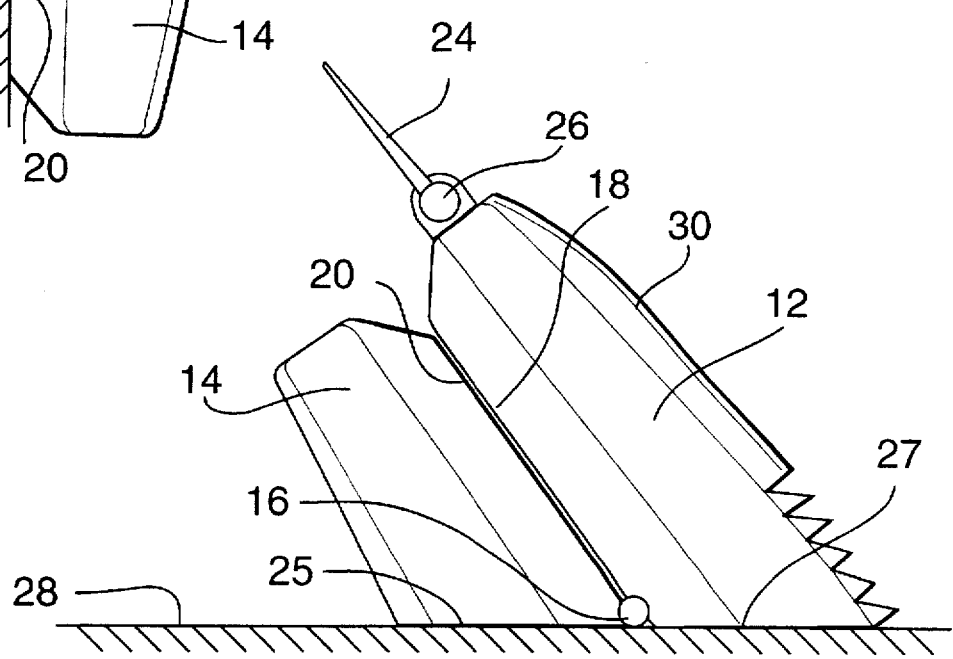
FIG. 2
FIG. 3

WIRELESS RECEIVER

This invention relates to wireless receivers.

A wireless receiver is an item of telecommunications equipment which receives radio messages from an outside source and is connected by cable to telecommunications terminal equipment such as a telephone terminal or a facsimile copying machine (commonly referred to as "fax" machine). A wireless receiver is not to be confused with another item of telecommunications equipment commonly referred to as a "telephone base station" or a "wireless base station". A telephone or wireless base station is one which is connected by cable to conventional telephone equipment and acts as a radio transmitter and receiver to a wireless telephone. Thus, a wireless receiver enables the use of conventional telecommunications terminal equipment, i.e. equipment served by telecommunications cable, thereby avoiding the necessity of using cellular or radio telecommunications terminal equipment.

Wireless receivers are for use particularly in regions of the world in which inadequate telecommunications cables already exist between transmitting and receiving locations in that they are capable of receiving and transmitting messages by radio thereby avoiding the problem of lack of cable. The only cable which is necessary is the short length of cable connecting the wireless receiver with the telecommunications terminal equipment within an office. Such cable is normally only of a few feet in length sufficient to convey signals between the receiver and the terminal either within a room or within the confines of a building.

The present invention seeks to provide a wireless receiver which is adaptable in use either for wall mounting or for supporting a horizontal surface such as a desk.

Accordingly, the present invention provides a wireless receiver comprising a first housing having a front surface and a rear surface and containing wireless signal transmission and receiving means, and a second housing pivotally mounted to the first housing and movable between a first position in which one the housings depends from the other housing which has means to hang the receiver upon a vertical surface, and a second position in which the second housing is located behind the first housing, the two housings together then providing lower support surface means for supporting the receiver upon a horizontal surface.

Hence, with the wireless receiver according to the invention, the first and second housings cooperate to provide the support surface means to support the receiver upon a horizontal surface or alternatively, the housings are carried one by the other with the receiver hanging from a vertical surface. This is a particularly practical arrangement depending upon the type of position in which the receiver is required to be located.

In a practical arrangement, it is advantageous for the second housing to contain a power supply and also possibly have a region for mounting a battery back-up unit for telephone usage. The battery back-up unit is particularly useful in the event that the power supply is cut-off as may occur sometimes in certain locations.

To enable the first and second housings to appear to be combined as a single unit, it is preferable for the second housing to have a surface which, with the second housing in the first position, provides a rear surface which is coplanar with the rear surface of the first housing. With this arrangement, the two rear surfaces then will hang directly down a vertical surface such as on a wall. Further, with the second housing in the second position, it is preferable for this particular surface to confront and lie substantially parallel to the rear surface of the first housing.

In addition, the support means in respect of each housing may comprise a planar support surface and with the second housing in its second position the two planar support surfaces of the housings are coplanar. This provides a particularly flat support for the wireless receiver to be disposed upon a horizontal surface. Also, with this arrangement, it is preferable for the two planar support surfaces of the support surface means to lie closely adjacent in confronting parallel relationship with the second housing in the first position.

One embodiment of the invention will now be described, by way of example, with reference to the accompanying drawings, in which:

FIG. 2 is a side elevational view of the wireless receiver mounted upon a vertical surface; and FIG. 3 is a side elevational view of the wireless receiver when carried upon a horizontal surface.

Figure 1:
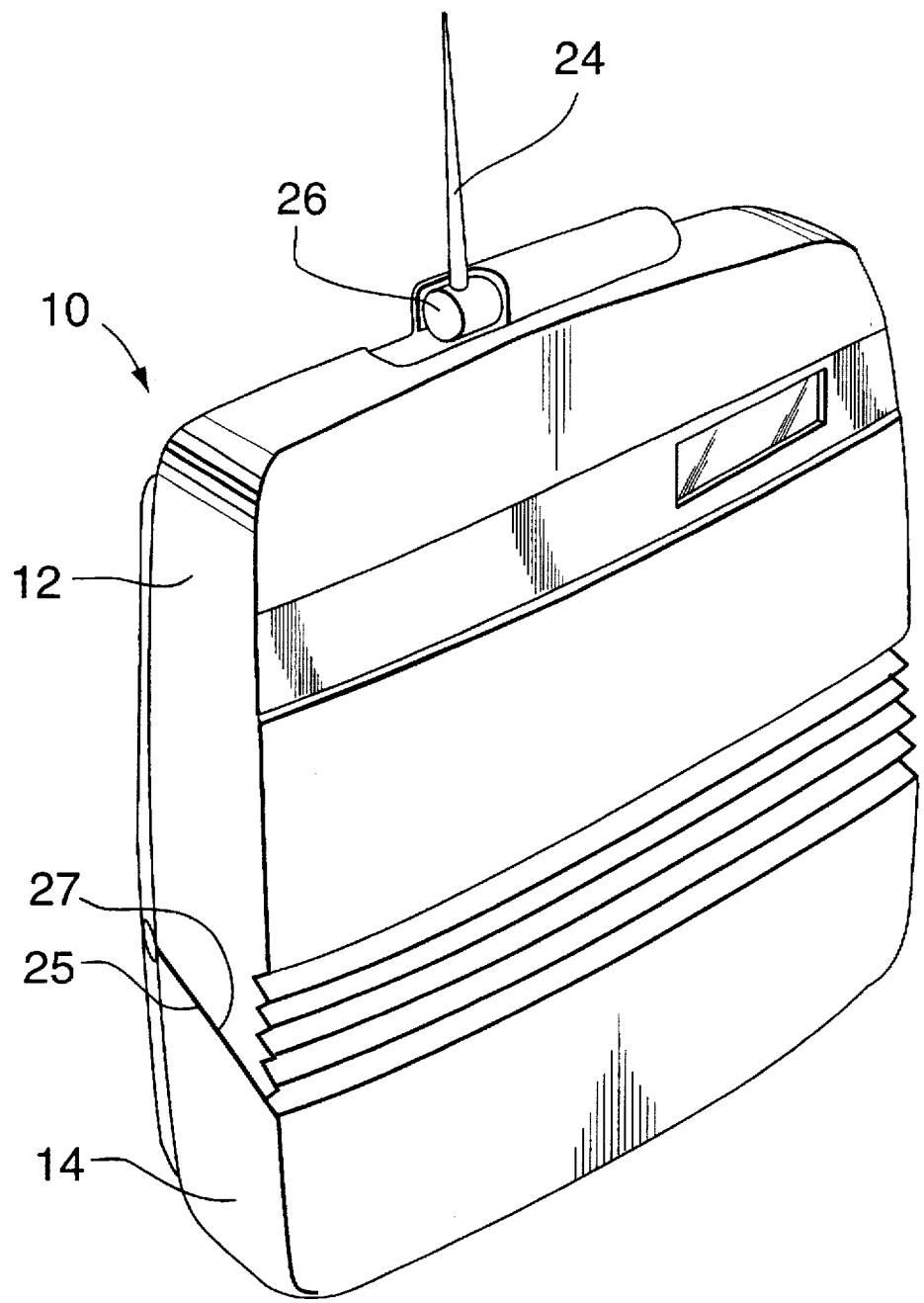
FIG. 1 is a front isometric view of a wireless receiver according to the embodiment.

As shown by the Figures, a wireless receiver 10 comprises two housings 12 and 14 which are connected together by a hinge 16. The hinge is located along a lower edge of a planar rear surface 18 of the housing 12 (as shown in FIG. 2). The housing 12 contains wireless signal transmission and receiving means which may be conventional construction for receiving and transmitting wireless or radio signals to and from an outside source. The other housing 14 contains a battery supply (not shown) and a battery back-up unit which is maintained charged by the power supply to continue uninterrupted operation of the wireless receiver in the event of power supply being curtailed. As shown by FIGS. 2 and 3, the housing 14 is pivotally connected to the housing 12 for movement of the housing 14 between a first position (FIG. 2) in which it depends directly from the housing 12, and a second position (FIG. 3) in which the housing 14 lies to the rear of the housing 12.

The housing 14 has a surface 20 to which the hinge 16 is also connected. The surface 20 is planar and, with the housing 14 in the position shown in FIG. 2 depending from housing 12 then the planar surface 20 is coplanar with surface 18. Hence, the wireless receiver 10 may be mounted upon a vertical wall surface 22 as shown by FIG. 2 with both of the surfaces 18 and 20 either resting against the surface 22 or in close proximity thereto as allowed for by any rearward projection of the hinge 16. In this position, an aerial 24 of the receiver and carried by the housing 12 possibly from a pivotal mounting 26, extends upwardly from the receiver.

The two housings between them provide support surface means for supporting the receiver upon a horizontal surface with the housing 14 disposed rearwardly of the housing 12 as shown by FIG. 3. This support surface means is provided by a planar support surface 25 of the housing 14 and a planar support surface 27 of the housing 12. These two planar support surfaces in the position shown in FIG. 3 are coplanar so as to cooperate to support the receiver upon a horizontal surface 28.

It is worthy of note that with the embodiment, in the position of the housing 14 in FIG. 1 its surface 25 lies closely adjacent to, confronts, and is substantially parallel to the surface 27 of the housing 12. Thus, with the housing 14 in the first position of FIG. 2, the receiver gives the appearance of being a single housing construction as is readily seen from FIGS. 1 and 2 of the drawings. In addition, the surfaces 25 and 27 lie in substantially parallel planes which are other than normal to the plane of the rear surface 18 of the housing 12 whereby, with the housing 14 in the second position of FIG. 3 and with the receiver mounted upon the horizontal surface 28, the front surface 30 of the housing 12 is inclined rearwardly from a lower to a top end. Thus, the front surface of the receiver faces upwardly towards a user of telephone equipment when mounted upon a desk. It is also noteworthy that with the housing 14 in its position rearwardly of the housing 12 in FIG. 3 then the surface 20 lies closely adjacent to, confronts, and is substantially parallel to the rear surface 18 of the housing 12. Thus, this may again give the impression that the housings 12 and 14 are a single housing structure instead of two separate items of the receiver which are hinged together. In view of the fact that the housings 12 and 14 are hingedly connected together in the manner described and in view of the relative positions of the surfaces 18, 20, 25 and 26 then for either of the positions of the housing 14, the receiver is of compact structure with minimal gap between the housings 12 and 14 while enabling the receiver to be mounted either in a vertical or in a horizontal position.

What is claimed is:

1. A wireless receiver comprising a first housing having a front surface and a rear surface and containing wireless signal transmission and receiving means, and a second housing pivotally mounted to the first housing and movable between a first position in which one of the housings depends from the other housing, which has means to hang the receiver upon a vertical surface, and a second position in which the second housing is located behind the first housing, the two housings together then providing lower support surface means for supporting the receiver upon a horizontal surface, and in respect of each housing, the support surface means comprises a planar support surface and with the second housing in the second position, the planar support surfaces of the first and second housings are coplanar.

2. A receiver according to claim 1 wherein the planar support surfaces of the housings lie in planes other than normal to the rear surface of the first housing which is also planar whereby, with the second housing in the second position and with the receiver supported upon a horizontal surface, the front surface of the first housing is inclined rearwardly from a lower to a top end of the housing.

3. A receiver according to claim 2 wherein the second housing has another planar surface which, with the second housing in the first position, provides a rear surface which is coplanar with a rear surface of the first housing and which, with a second housing in the second position, confronts and lies substantially parallel to the rear surface of the first housing.

4. A receiver according to claim 3 wherein, in the first position of the second housing, its planar support surface confronts, is adjacent to, and lies substantially parallel to the planar support surface of the first housing.

5. A wireless receiver comprising a first housing having a front surface and a planar rear surface and containing wireless signal transmission and receiving means, and a second housing having a planar surface, the second housing pivotally mounted to the first housing and movable between a first position in which one of the housings depends from the other housing, which has means to hang the receiver upon a vertical surface, and a second position in which the second housing is located behind the first housing, and in the first position of the second housing, the planar surface of the second housing provides a rear surface which is coplanar with the rear surface of the first housing, and in the second position of the second housing, the planar surface of the second housing confronts and lies substantially parallel to the rear surface of the first housing and the two housings together then provide lower support surface means for supporting the receiver upon a horizontal surface.

* * * * *